(12) United States Patent
Hsiao (10) Patent No.: US 7,399,033 B2
(45) Date of Patent: Jul. 15, 2008

(54) VEHICLE VIDEO DISPLAY DEVICE ON ARMREST

(75) Inventor: Ai-Lang Hsiao, Da-Shi Town, Taoyuan County (TW)

(73) Assignee: Rader Electronics Co., Ltd., Taoyuan County (TW)

( * ) Notice: Subject to any disclaimer, the term of this patent is extended or adjusted under 35 U.S.C. 154(b) by 288 days.

(21) Appl. No.: 11/419,510

(22) Filed: May 22, 2006

(65) Prior Publication Data

US 2008/0036925 A1 Feb. 14, 2008

(51) Int. Cl.
*A47C 7/72* (2006.01)

(52) U.S. Cl. .............................. 297/217.3; 297/188.15; 248/921; 248/923; 348/837

(58) Field of Classification Search ............ 297/188.15, 297/188.16, 217.3; 248/27.1, 27.3, 917–923; 296/37.12, 37.5, 37.8; 348/837
See application file for complete search history.

(56) References Cited

U.S. PATENT DOCUMENTS

| | | | | |
|---|---|---|---|---|
| 5,177,616 | A * | 1/1993 | Riday | 297/217.3 |
| 5,179,447 | A * | 1/1993 | Lain | 297/217.3 |
| 5,398,991 | A * | 3/1995 | Smith et al. | 297/188.16 |
| 6,179,263 | B1 * | 1/2001 | Rosen et al. | 248/918 |
| 6,581,893 | B1 * | 6/2003 | Lu | 248/919 |
| 6,644,611 | B1 * | 11/2003 | Tai | 361/681 |
| 6,719,343 | B2 * | 4/2004 | Emerling et al. | 296/37.8 |
| 7,040,699 | B2 * | 5/2006 | Curran et al. | 297/217.3 |
| 7,261,266 | B2 * | 8/2007 | Satterfield | 297/217.3 |
| 2001/0042812 | A1 * | 11/2001 | Perzewski | 248/27.1 |
| 2006/0249632 | A1 * | 11/2006 | McKelvey | 297/217.3 |

\* cited by examiner

*Primary Examiner*—Peter R. Brown
(74) *Attorney, Agent, or Firm*—Leong C. Lei (57) ABSTRACT

A vehicle video display device is installed on the armrest of a vehicle. Two arm members have one of their ends pivotally attached to two opposite surfaces of the armrest so that the two arm members extend outward from the armrest in parallel. A beam member has its two ends rotatably joined to the other ends of the two arm members respectively so that the beam member is supported across the armrest. A screen member is positioned rotatably on the beam member by an axle.

11 Claims, 7 Drawing Sheets

VEHICLE VIDEO DISPLAY DEVICE ON ARMREST

BACKGROUND OF THE INVENTION (a) Technical Field of the Invention

The present invention generally relates to video display devices, and more particularly to an vehicle video display device installed on the armrest of a vehicle.

(b) Description of the Prior Art

Vehicle video display devices for the presentation of movies, electronic maps, and the images captured by bumper cameras have been widely popular in recent years. The vehicle video display device usually contains a miniature LCD screen supported by a base on the dashboard or at the front center of the dashboard.

Unless the vehicle video display device is provider as an integral part of the vehicle system by the car manufacturer, the installation of the vehicle video device usually requires some destructive means to the interior of the vehicle, which will also make the vehicle's already limited space even, more crowded. On the other hand, the usual location of the vehicle video device is either on the dashboard or in front of the dashboard, which is difficult for the rear-seat passengers to watch.

SUMMARY OF THE INVENTION

The primary purpose of the present invention is to provide an vehicle video display device that can be installed by the owner easily on the armrest between the driver and passenger seats or between the rear seats for the convenient, viewing of the rear-seat passengers.

According to the present invention, two arm members have one of their ends pivotally attached to two opposite surfaces of the armrest so that the two arm members extend outward from the armrest in parallel. A beam member has its two ends rotatably joined to the other ends of the two arm members respectively so that the beam member is supported across the armrest. A screen member of the vehicle video display device is positioned rotatably on the beam member by an axle.

The screen member installed as such can be turned towards either one of the rear-seat passengers by the axle. The screen member can also be tilted forward or backward by the rotation of the beam member for an appropriate viewing angle. If the video display device is not used, the screen member can be flipped completely downward so as to clear the space on the armrest. The height and distance of the screen member to the rear-seat passengers can also be adjusted by the swing of the arm members. The beam member can be cut for an appropriate length so as to fit on an armrest of a specific width.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following, description provides a convenient illustration for implementing exemplary embodiments of the invention. Various changes to the described embodiments may be made in the function and arrangement of the elements described without departing from the scope of the invention as set forth in the appended claims.

Figure 1:
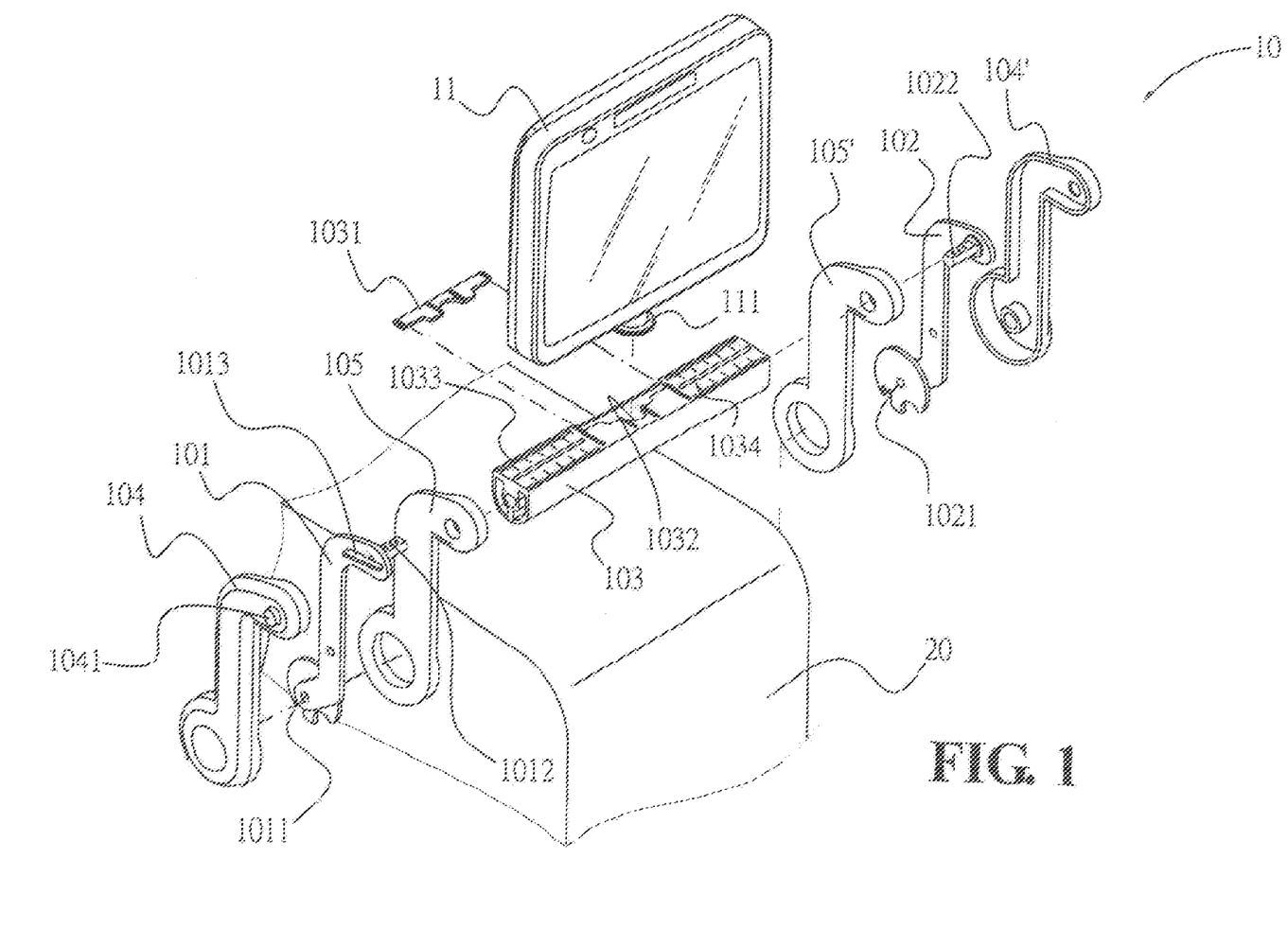
FIG. 1 is a perspective diagram showing the various components of an vehicle video display device according to an embodiment of the present invention.
Figure 2:
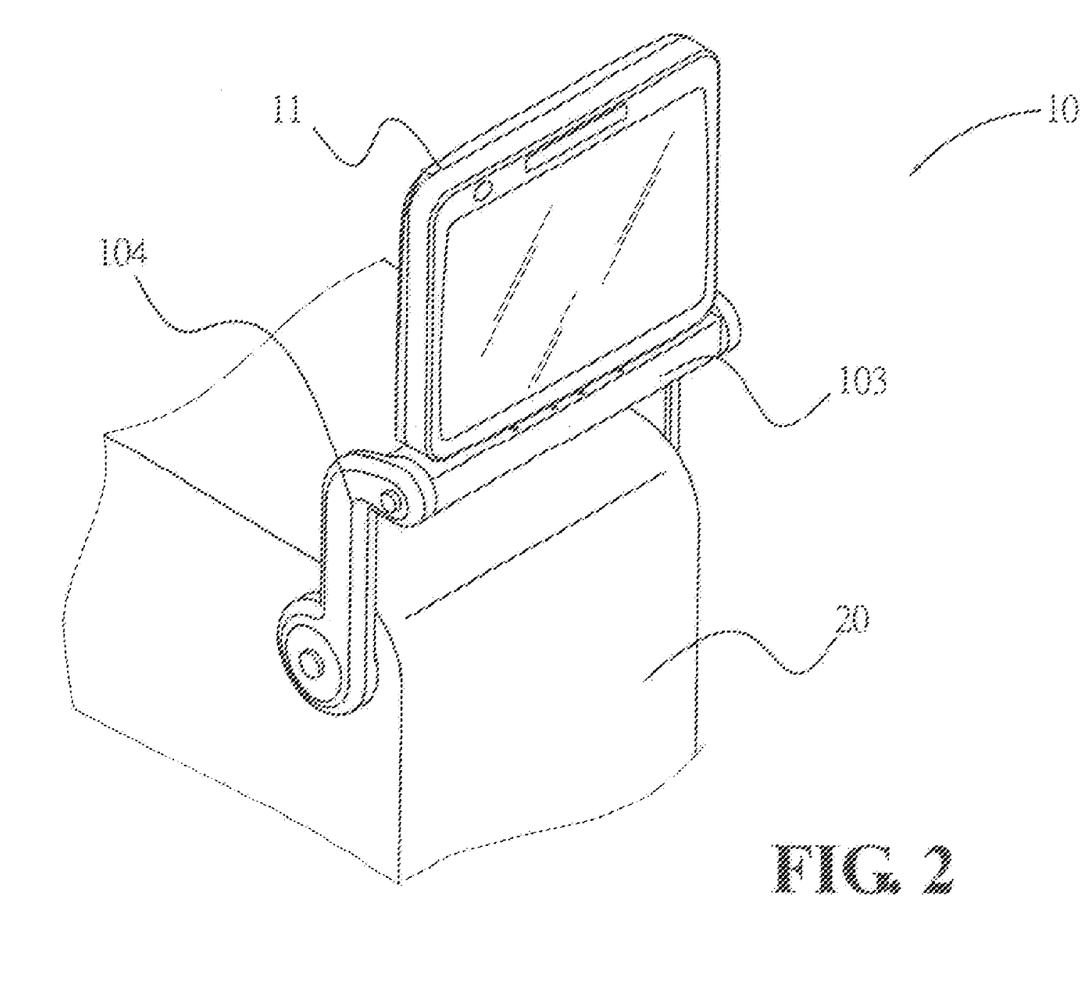
FIG. 2 is a perspective diagram showing the vehicle video display device of FIG. 2 after its assembly.

As shown in FIGS. 1 and 2, the vehicle video display device 10 according to an embodiment of the present invention is installed on the armrest 20 between the driver and passenger seats. In the following, all directional or positional references in the specification are made relatively to the armrest 20. The video display device 10 mainly contains two arm members 101 and 102, and a beam member 103. The arm members 101 and 102 can be housed inside a pair of an outer cover 104 and an inner cover 105 of corresponding shapes, and another pair of an outer cover 104' and an inner cover 105' of corresponding shapes, respectively. The arm members 101 and 102 have lower joints 1011 and 1021 at one of their ends pivotally jointed to corresponding locations on two opposite surfaces of the armrest 20 adjacent to the driver and passenger seats respectively. As such, the arm members 101 and 102 extend in parallel outward from the armrest 20 and can be swung around their lower joints 1011 and 1021 respectively. The beam member 103 has its two ends rotatably joined to the upper joints 1012 and 1022 at the other ends of the two arm members 101 and 102 respectively so that the beam member 103 is supported across the armrest 20.

Figure 3:
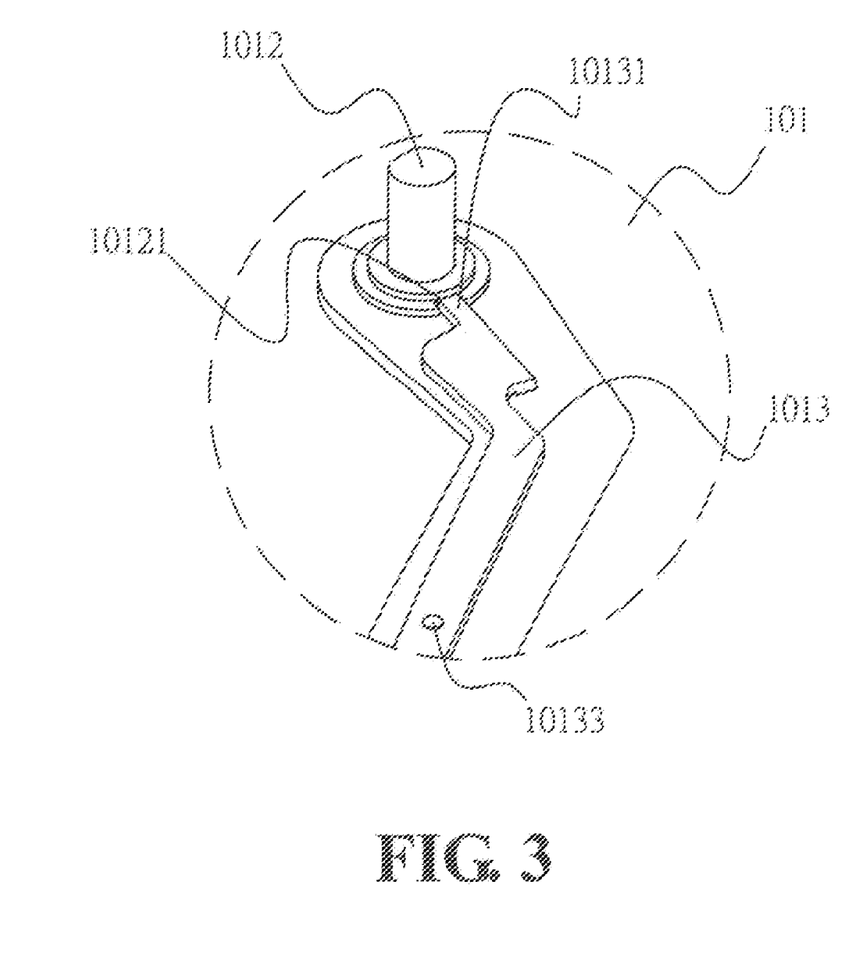
FIG. 3 is an enlarged perspective view the showing the details of the upper joint of an arm member of the vehicle video display device of FIG. 1.
Figure 4:
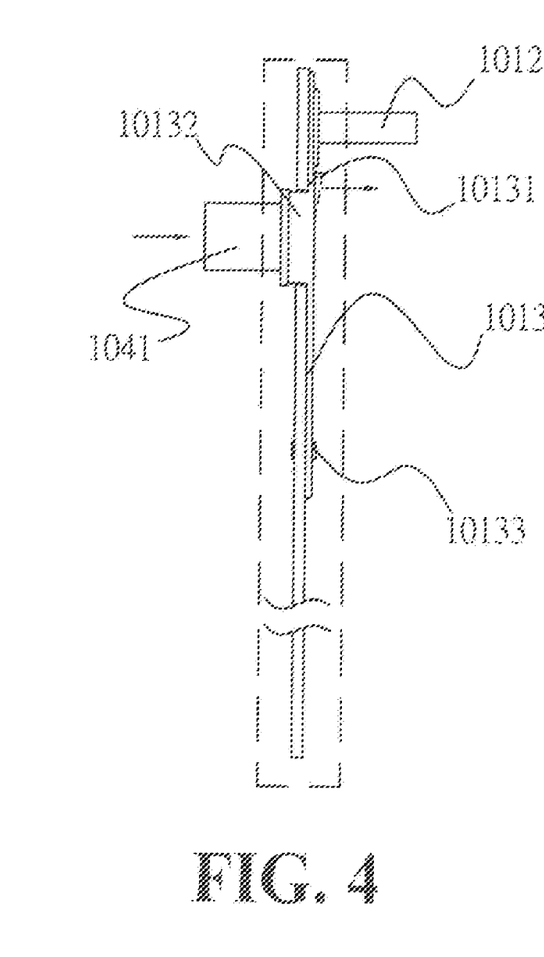
FIG. 4 is an enlarged profile view showing the details of the upper joint of an arm member of the vehicle video display device of FIG. 1.

Each of the upper joints 1012 and 1022 is basically a pin extending perpendicularly from the arm members 101 and 102 and can be embedded inside the connection holes at the two ends of the beam member 103. The upper joint 1012 is rotatably mounted on the arm members 101 and is locked to its corresponding correction hole so that the beam member 103 and the locked upper joint 1012 rotate along with each other. Please note that in alternative embodiments, it can be the other upper joint 1022 that is locked to the beam member 103, or both the upper joints 1012 and 1022 are locked to the beam member 103. For simplicity, in the following the upper joint 1012 is used as an example. As shown in FIGS. 3 and 4, the bottom of the upper joint 1012 has a notch 10121 which provides the entrapment of an elongated lock piece 1013. The lock piece 1013 has one of its ends affixed to the arm member 101 by a bolt 10133 and the lock piece 1013 is therefore flexibly positioned along the inner surface of the arm member 101. The other end of the lock piece 1013 has a tooth 10131 for embedding into the notch 10121 of the upper joint 1012 and a section 10132 bulging through and exposed above the outer surface of the arm member 101. As such, when the beam member 103 and the upper joint 1012 rotate together, they will be locked at a position when the notch 10121 traps the tooth 10131. Then, by exerting pressure on the exposed section 10132 from the outer surface of the arm member 101, the entrapment of the tooth 10131 is released and the beam member 103 along with the upper joint 1012 can freely rotate again. To facilitate the release of the room 10131, a button 1041 can be elastically provided on the outer cover 104 at a location corresponding to the exposed section 10132. By pressing the button 1041 and in turn driving the exposed section 10132 inward, the tooth 10131 can be easily released.

Figure 5:
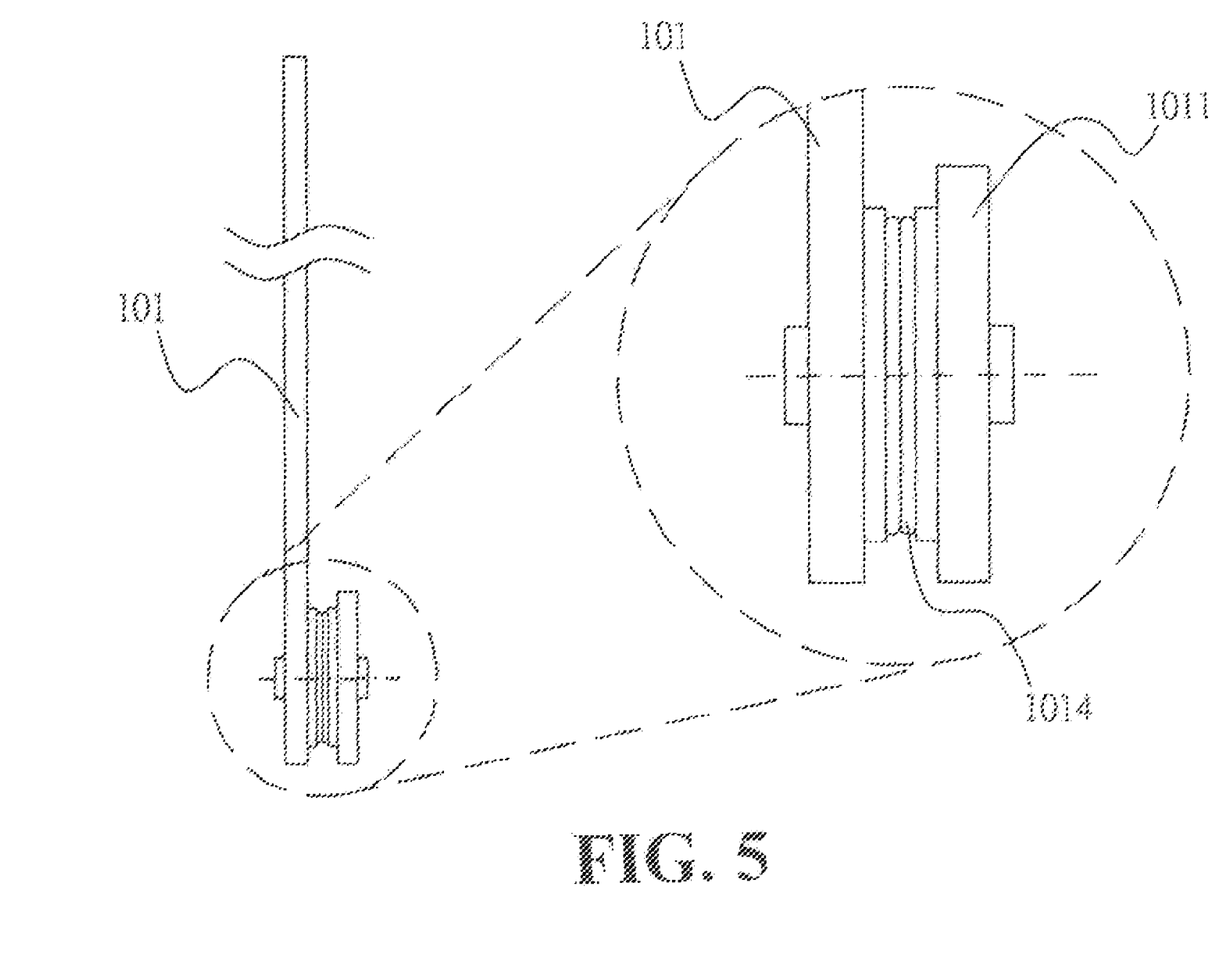
FIG. 5 is an enlarged profile view showing the details of the lower joint of an arm member of the vehicle video display device of FIG. 1.

The lower joints 1011 and 1021 are identical and in the following the lower joint 1011 is used as an example for explanation. The lower joint 1011 and the arm member 101 are pin-joined together to the armrest 20. An interference means 1014 is provided between the lower joint 1011 and the arm member 101 and, with the friction provided by the interference means 1014, the arm member 101 can be rotated relatively to the lower joint 1011 and held at a specific position. The interference means 1014 can be two closely engaged rubber rings (as shown). Ratchet or similar mechanism can also be used. The interference means can be provided for at least one of the arm members 101 and 102. Please also note that instead of using a locking mechanism between at least one of the arm members 101 and 102 and its respective upper joint 1012 or 1022, similar interference means as described can be used.

As shown in FIG. 1, the beam member 103 has a flat surface with scale markings 1033. The scale markings 1033 provide convenient reference when it is required to cut short the beam member 103 to fit on an armrest of a specific width. In the middle section of the beam member 103, an axle hole 1032 is formed on the flat surface by a removable piece 1031 and the body of the beam member 103. A screen member 11 of the display device 10 has an axle 111 at the center of the bottom rim. The axle 111 can be rotatably mounted in the axle hole 1032 so that the screen member 11 can be swung relatively to the beam member 103.

Figure 6:
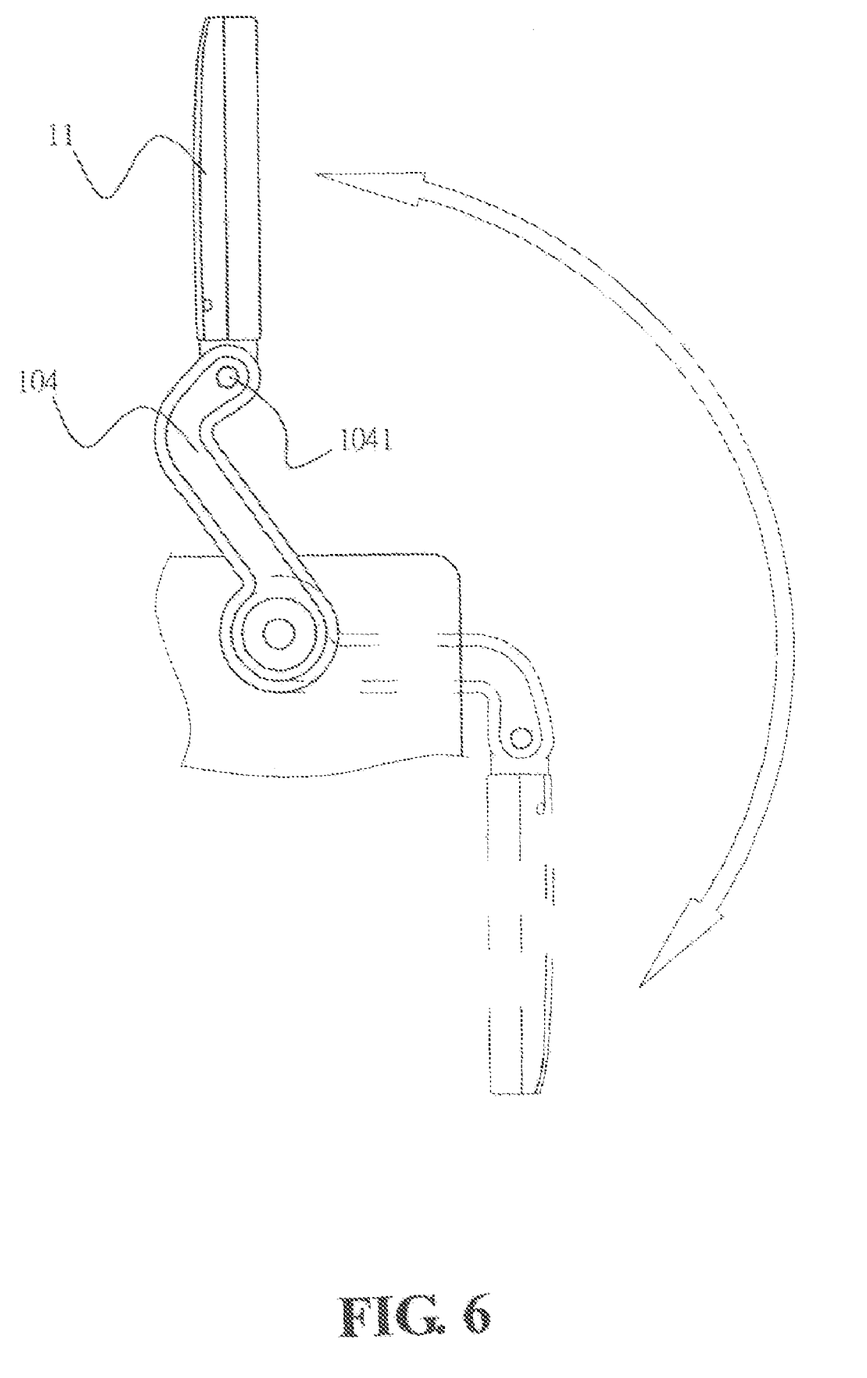
FIG. 6 is a profile view of the vehicle video display device of FIG. 1 with the screen member at a normal viewing position.

As shown in FIG. 6, after the display device 10's assembly, the screen member 11 can be flipped to and locked at an upright position, by the locking mechanism of the upper joint 1012 and the beam member 103. The screen member 11 then is erected vertically and reliably on top of the armrest 20. The height and distance of the screen member 11 to the rear-seat passengers can be adjusted by swing the arm members 101 and 102 (in the diagram only the outer covers 104 is shown) forward or backward. The screen member 11 can also be tilted forward or backward by the rotation of the beam member 103 for an appropriate viewing angle (if interference means is used for the upper joints 1012 and/or 1022).

Figure 7:
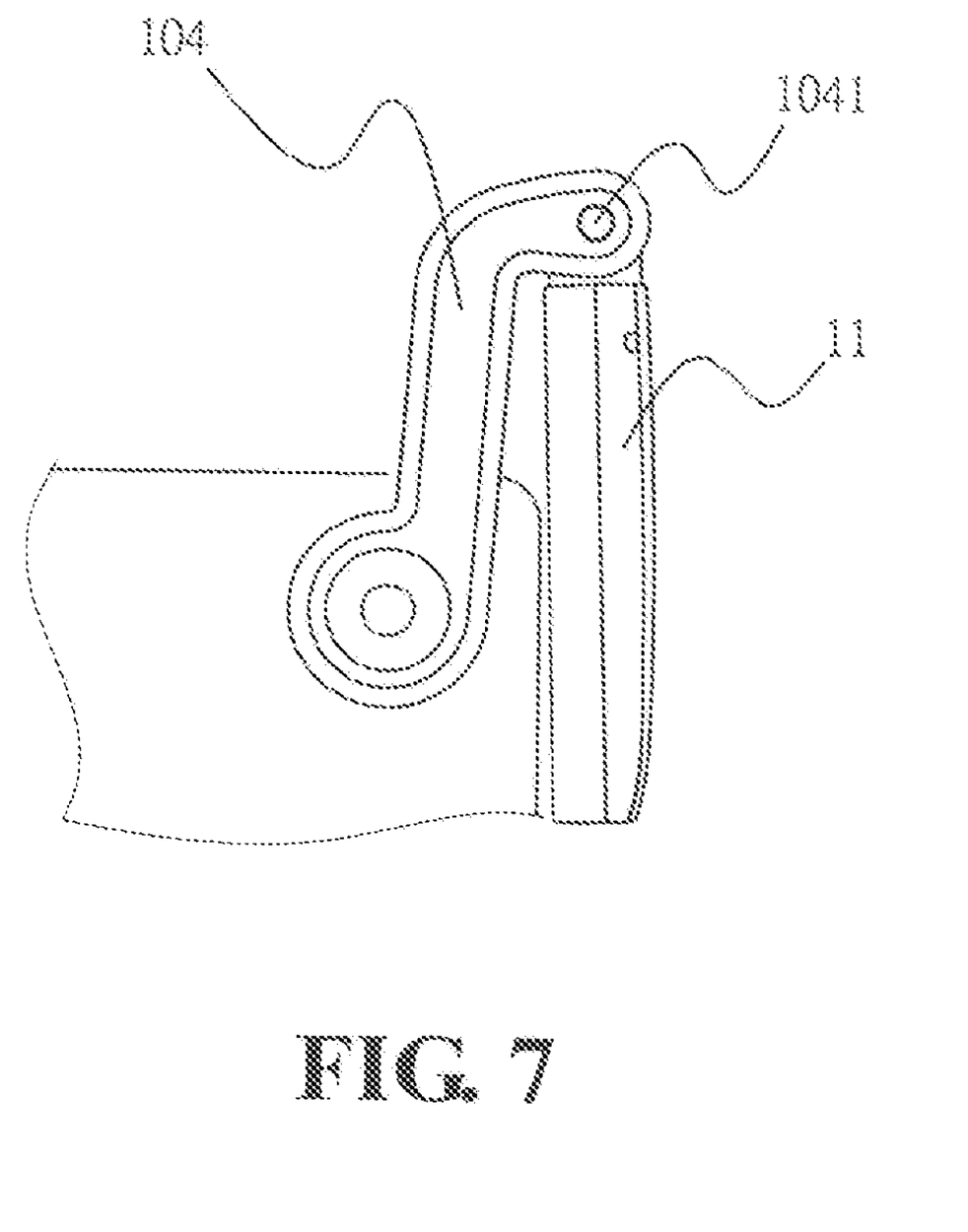
FIG. 7 is a profile view of the vehicle video display device of FIG. 1 with the screen member folded.
Figure 8:
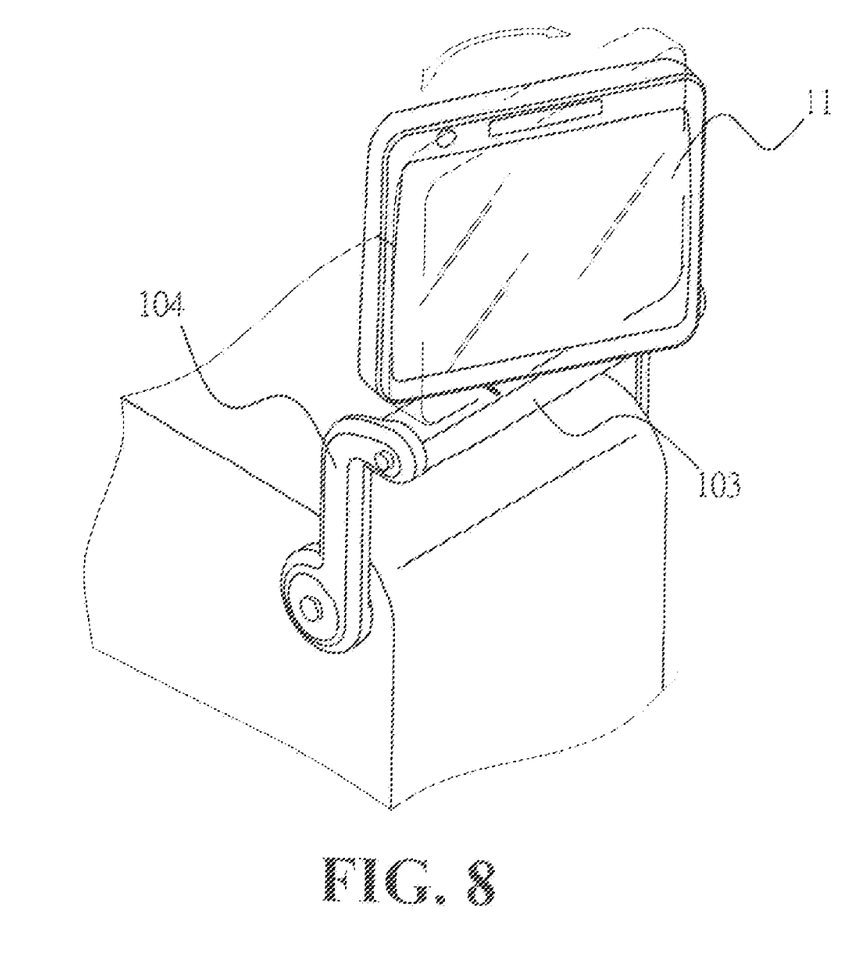
FIG. 8 is a perspective view of the vehicle video display device of FIG. 1 with the screen member turned to a side.

As shown in FIG. 7, if the video display device is not used, the screen member 11 can be released from the upright position try pressing the button 1041 and flipped completely downward so as to clear the space on the armrest 20. As shown in FIG. 8, by the axle 111, the screen member 11 can be turned towards either one of foe rear-seat passengers for better viewing comfort.

Please note that, in the foregoing description, it is assumed that the armrest 20 is the one between the driver and passenger seats. The present invention can actually be installed on the armrest between, the rear seats as well with very little or no modification. Similarly, the present invention can also be installed on the armrest between the passenger seats of a bus, an airplane, or any kind of vehicles.

The present invention provides a number of advantages over the prior arts. Firstly, the present invention requires only the easy assembly of a few components for a significant redaction of cost. Secondly, the position and angle of the screen member can be flexibly and conveniently adjusted in three degrees of freedom. The screen member can be "folded" so as to occupy minimum space when not in use. In addition, the beam member can be cut to fit on armrests of various sizes.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An vehicle video display device installed on an armrest of a vehicle comprising:
    two arm members each having an upper joint and a lower joint at either ends respectively, said lower joints being attached to two opposite surfaces of said armrest respectively so that said arm members extends pivotally outward from said armrest in parallel;
    a beam member having its two ends rotatably joined to said upper joints of said arm members respectively so that said beam member is supported across said armrest, said beam member having an axle hole; and
    a screen member rotatably mounted on said beam member by an axle extending from the bottom of said screen member to said axle hole of said beam member.

2. The vehicle video display device according to claim 1, wherein, for at least one of said arm members, said upper joint rotates along with said beam member and has a notch to trap a first end of an elongated lock piece positioned along the inner surface of said arm member whose second end is fixedly bolted to said arm member; and said lock piece has a section adjacent to said first end bulging through and exposed above the outer surface of said arm member.

3. The vehicle video display device according to claim 2, wherein each of said arm members is enclosed by an outer cover and an inner cover respectively; and a button is provided on a least one of said outer covers at a location corresponding to said section of said lock piece.

4. The vehicle video display device according to claim 1, wherein, for least one of said arm members, an interference means is provided between said arm member and its respective upper joint.

5. The vehicle video display device according to claim 4, wherein said interference means comprises engaged rubber rings.

6. The vehicle video display device according to claim 4, wherein said interference means comprises ratchet means.

7. The vehicle video display device according to claim 1, wherein, for at least one of said arm members, an interference means is provided between said arm members and its respective lower joint.

8. The vehicle video display device according to claim 7, wherein said interference means comprises engaged rubber rings.

9. The vehicle video display device according to claim 7, wherein said interference means comprises ratchet means.

10. The vehicle video display device accenting to claim 1, wherein each of said arm members is enclosed, by an outer cover and an inner cover respectively.

11. The vehicle display device according to claim 1, wherein scale markings are provided along the body of said member.

* * * * *